(12) United States Patent
Labbe et al.

(10) Patent No.: US 7,877,015 B2
(45) Date of Patent: *Jan. 25, 2011

(54) OPTICAL TO RADIO FREQUENCY DETECTOR

(75) Inventors: Patrick Labbe, Paris (FR); Arianna Filoramo, St. Remy les Churunne (FR); Eric Toussaere, Gif-sur-Yvette (FR); Joseph Zyss, Gif-sur-Yvette (FR)

(73) Assignee: Freescale Semiconductor, Inc., Austin, TX (US)

( * ) Notice: Subject to any disclaimer, the term of this patent is extended or adjusted under 35 U.S.C. 154(b) by 1118 days.

This patent is subject to a terminal disclaimer.

(21) Appl. No.: 10/504,010

(22) PCT Filed: Jan. 13, 2003

(86) PCT No.: PCT/EP03/00224

§ 371 (c)(1),
(2), (4) Date: Nov. 7, 2006

(87) PCT Pub. No.: WO03/067321

PCT Pub. Date: Aug. 14, 2003

(65) Prior Publication Data

US 2007/0058977 A1    Mar. 15, 2007

(30) Foreign Application Priority Data

Feb. 8, 2002  (EP) .................................. 02290318

(51) Int. Cl.
*H04B 10/00* (2006.01)
(52) U.S. Cl. ........................ 398/115; 398/116; 398/117; 398/134; 398/178; 398/214; 398/140; 398/141; 398/142

(58) Field of Classification Search ................. 398/115, 398/116, 117, 134, 178, 214, 135; 385/8, 385/9, 14, 28, 30, 40
See application file for complete search history.

(56) References Cited

U.S. PATENT DOCUMENTS

| | | | | |
|---|---|---|---|---|
| 5,317,666 | A | * | 5/1994 | Agostinelli et al. .......... 385/122 |
| 5,327,149 | A | * | 7/1994 | Kuffer ......................... 343/720 |
| 5,515,463 | A | * | 5/1996 | Hahn ............................ 385/40 |
| 5,689,358 | A | * | 11/1997 | Nakao et al. ................. 359/248 |
| 5,710,651 | A | * | 1/1998 | Logan, Jr. ................... 398/168 |
| 5,917,636 | A | * | 6/1999 | Wake et al. .................. 398/182 |

(Continued)

OTHER PUBLICATIONS

Charra, All Optic Poling of Polymers, Photoactive Organic Materials: Science and Applications, 1996, Klawer Academic Publishers, pp. 513- 514.*

(Continued)

*Primary Examiner*—Ken N Vanderpuye
*Assistant Examiner*—Danny W Leung

(57) ABSTRACT

An optical to radio frequency detector comprises an optical guide for receiving two optical signal components having frequencies that differ by an amount corresponding to a radio frequency, and a radio signal guide coupled with an interaction zone of the optical guide for propagating a radio signal from the interaction zone at the radio frequency. The material of the interaction zone presents a second-order non-linear optical polarization characteristic to the propagation of the optical signal components, and the radio signal guide is in travelling-wave coupling with the interaction zone. A radio signal output is coupled with the radio signal guide.

17 Claims, 4 Drawing Sheets

U.S. PATENT DOCUMENTS

| | | | |
|---|---|---|---|
| 6,522,793 B1* | 2/2003 | Szilagyi et al. | 385/2 |
| 7,340,178 B2* | 3/2008 | Labbe et al. | 398/115 |
| 7,653,313 B2* | 1/2010 | Lee et al. | 398/115 |
| 7,697,846 B2* | 4/2010 | Shoji et al. | 398/115 |
| 2007/0058977 A1* | 3/2007 | Labbe et al. | 398/115 |

OTHER PUBLICATIONS

Wang Wenshen, 40-GHZ polymer electrooptic phase modulators, 1995, IEEE photonics technology Letters, p. 638-640.*

Teng, travelling-wave polymeric optical intensity modulator with more than 40 GHz electrical bandwidth, 1992 american institute of physycs, applied physics of Letters, p. 1538-1540.*

Wenshen, Wang, Travelling wave electro-optic phase modulator using cross-linked nonlinear optical polymer, 1994 Applied physics Letters, p. 929-931.*

Dubovitsky et al., "Integrated Optics Photonic Mixer for an All-Optical Implementation of a Millimeter and Sub-millimeter Wave Oscillator," IEEE International Topical Meeting on Microwave Photonics, Oct. 1998, pp. 85-86.

Delaire et al., "Films de Polymeres Pour L'optique Non Lineaire du Second Ordre," Onde Electrique, Editions Chiron S.A. Paris, FR., vol. 74, No. 6, Nov. 1, 1994, pp. 16-20.

Shi et al., "Fabrication and Characterization of High-Speed Polyurethane-Disperse Red 19 Integrated Electrooptic Modulators for Analog System Applications," IEEE Quantim Electronics vol. 2, No. 2, Jun. 1996, pp. 289-298.

Bridges et al., "Wave-Coupled LiNBO$_3$ Electrooptic Modulator for Microwave and Millimeter-Wave Modulation," IEEE Photonics Technology Letters, Feb. 1991, pp. 133-135.

Kato, "Ultrawide-Band/High-Frequency Photodectors," IEEE 1999, pp. 1265-1280.

Labbe et al., "Electro-optic Polymer Based Devices and Technology for Optical Telecommunication," Comptes Rendus De L'Academie Des Sciences, Serie IV (Physique, Astrophysique), May 2002, vol. 3, No. 4, pp. 543-554.

Shi et al., "40-GHz Polymer Electrooptic Phase Modulators," IEEE Photonics Technology Letters, Jun. 1995, pp. 638-640.

Wang et al., "Traveling Wave Electro-Optic Phase Modulator Using Cross-Linked Nonlinear Optical Polymer," American Institute of Physics, Applied Physics Letters, Aug. 1994, pp. 929-931.

Teng, "Traveling-Wave Polymeric Optical Intensity Modulator With More Than 40 GHz of 3-dB electrical bandwidth," American Institute of Physics, Applied Physics Letters, Mar. 1992, pp. 1538-1540.

PCT/EP03/00224 International Search Report.

Jinsong Xia et al., "Single-mode condition for silicon rib waveguides with large cross sections," Society of Photo-Optical Instrumentation Engineers, 43(9), Sep. 2004, pp. 1953-1954.

J. Liang et al., "Low loss, low, refractive index fluorinated self-crosslinking polymer waveguides for optical applications," Elsevier Science B.V., Optical Materials, Jan. 9, 1998, pp. 230-235.

U. Gliese et al., "Chromatic Dispersion in Fiber-Optic Microwave and Millimeter-Wave Links," IEEE Transactions on Microwave Theory and Techniques, vol. 44, No. 10, Oct. 1996, pp. 1716-1724.

Datong Chen et al., "High-Frequency Polymer Modulators with Integrated Finline Transitions and Low Vtt," IEEE Photonics Technology Letters, vol. 11, No. 1, Jan. 1999, pp. 54-56.

Ulrik Gliese et al., "Multifunctional Fiber-Optic Microwave Links Based on Remote Heterodyne Detection," IEEE Transactions on Microwave Theory and Techniques, vol. 46, No. 5, May 1998, pp. 458-468.

Boyd, R. et al., "Nonlinear Optics, Third Edition; Chapter 2: Wave-Equation Description of Nonlinear Optical Interactions," Academic Press, 2008, pp. 69-133.

Frlan, E. et al., "Generation of Tunable, CW, Microwave Radiation in X-band by Difference-frequency Mixing," IEEE Electronics Letters, vol. 30, No. 7, Mar. 31, 1994, pp. 595-597.

Lavedan, L.J., "Design Waveguide-to-Microstrip Transitions Specially Suited to Millimetre-Wave Applications," IEEE Electronics Letters, vol. 13, No. 20, Sep. 20, 1977, pp. 604-605.

Wake, D. et al., "Passive Picocell: A New Concept in Wireless Network Infrastructure," IEEE Electronics Letters, vol. 33., No. 5, Feb. 27, 1997, pp. 404-406.

* cited by examiner

OPTICAL TO RADIO FREQUENCY DETECTOR

FIELD OF THE INVENTION

This invention relates to radio frequency modulated optical radiation and, more particularly, to apparatus for detecting radio signals modulated on optical signals.

BACKGROUND OF THE INVENTION

Radio frequency modulated optical fibres systems, such as those described in U.S. Pat. No. 5,917,636 enable a mobile network to be built covering wide areas. These systems are capable of accepting continuous increase in demand in terms of data rate and free spectrum range and of expansion of the equipment and infrastructure installed. The increase of frequency of these systems enables a reduction in the size of the antennae and devices used in the radio frequency part of the network and an increase in the bandwidth of the whole system. For data rates of 155 MBit/s and higher, two spectral ranges of 62-63 GHz and 65-66 GHz, which are still unallocated by ITU, have been identified within the framework of the NBS project (RACE 2067) as particularly suitable for such systems.

The present invention is applicable to these frequency ranges and other frequencies, especially but not exclusively in the so-called millimetric radio frequency ranges, where the wavelength of the radio signal in free air is of the order of one to ten millimeters. Such radio signals may be subject to strong absorption by the atmosphere and by common building materials, so that it is of particular interest transmission for the radio signals to be modulated onto an optical signal that is guided in an optical fibre from a source- to a so-called picocell, where the radio signal may be detected and, if desired, radiated over a relatively short distance.

In order to minimise problems resulting from chromatic dispersion in the optical fibres, generation of the modulated optical signals is preferably obtained by combining two phase-correlated optical carriers which are generated in a dual-frequency laser transmitter with a frequency offset equal to the desired microwave frequency of the radio carrier signal. The two optical signals are then transmitted through optical fibre and the radio signal is recovered in a detector. Systems of this kind are described for example in the article "Chromatic dispersion in fiber-optic microwave and millimeter wave links" in IEEE Transactions on Microwave Theory and Techniques, volume 44 number 10 pages 1716 to 1724 and the article "Multifunctional fiber-optic microwave links based on remote heterodyne detection" in IEEE Transactions on Microwave Theory and Techniques, volume 46 pages 458 to 468.

An example of a communication system of this kind, which may be used in a system in accordance with the present invention, is shown in FIG. 1 and comprises, at the transmitter end, a master laser 1, connected by optical fibre 2 to a radio frequency modulator 3, which in turn is connected by optical fibre 4 to a beam splitter 5. The two optical signals from the beam splitter 5 are connected by optical fibres 6 to two slave lasers 7 tuned to frequencies spaced apart by an amount equal to the radio signal frequency, which act as filters to generate optical signals with a high degree of phase correlation and spectral purity. The outputs of the slave lasers 7 are connected to a recombination device 8 before transmission over the optical fibre output line 9. At the receiver end, the system comprises a detector 10 that receives the optical signals in the optical fibre line 9 and demodulates the radio signals.

It is important for the modulator 3 and detector 10 to provide efficient generation and detection of the radio frequency modulated optical signals. Many proposals have been made based on the use of semiconductor materials in which the optical and radio waves interact. Thus, U.S. Pat. No. 5,917,636 discloses the use of an electro-absorption layer comprising a multi-quantum well structure of InGaAsP, whose physical dimensions are very much smaller than the wavelength of the radio signals used.

The article "Ultrawide-band/high frequency photodetectors" in IEEE Transactions on Microwave Theory and Technique, Volume 47 pages 1265 to 1281 discloses the use of photodetector material for the interaction in conjunction with various wave-guide and travelling-wave structures for the radio frequency signal. Once again, the dimensions of the detector material are very much smaller than the radio frequency wavelength.

The article "High frequency polymer modulators with integrated finline transitions and low $V_\pi$" in IEEE Photonics Technology Letters, Volume 11 pages 54 to 56 discloses the use of a non-linear optical polymer material in a radio frequency modulator for the optical signal, the material being disposed between two electrodes terminating a radio frequency microstrip wave-guide. The radio signal detector described in that article is a photodetector.

In the known systems, problems arise with the efficiency of the systems and the requirement to provide a stabilised voltage for photodiode and phototransistor devices, whose efficiency reduces further at higher frequencies, especially above 100 GHz, for example.

We have found that critical factors in the design of suitable radio frequency modulator and detector devices for use in such systems, especially passive devices, relate to the choice of electro absorption materials and also to the coupling between the various parts of the devices.

SUMMARY OF THE INVENTION

The present invention provides an optical to radio frequency detector and communication apparatus as described in the accompanying claims.

DETAILED DESCRIPTION OF THE PREFERRED EMBODIMENTS

The accompanying drawings show apparatus for converting between optical and radio frequency signals in accordance with one embodiment of the present invention. The apparatus shown in FIGS. 2 to 6 of the drawings is an optical to radio frequency detector and this embodiment of the invention is described with reference to a detector; however, it will be appreciated that similar design principles can be applied to a modulator for modulating an optical signal with a radio frequency signal. The design principles are also applicable to a transceiver, that is to say a device that receives optical signals modulated by a first radio signals and detects the first radio signals, and modulates the optical signals with a second radio signal that is transmitted elsewhere.

Figure 1:
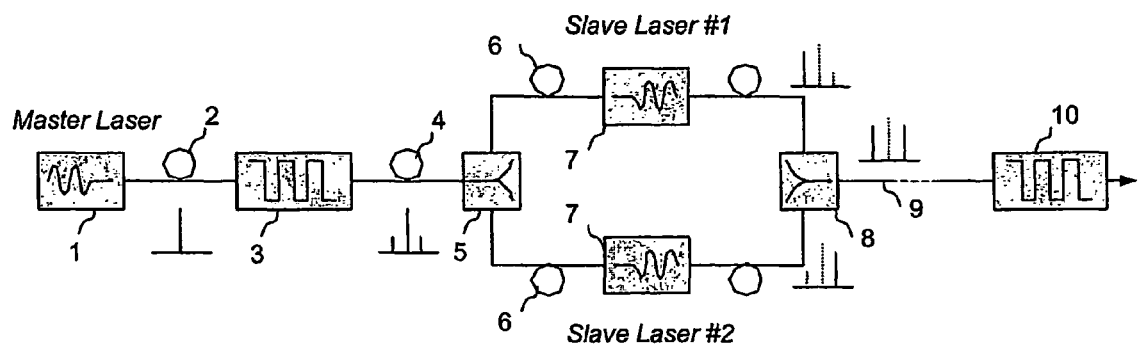
FIG. 1 is a block schematic diagram of a communication system in accordance with one embodiment of the invention.

More specifically, FIG. 1 of the drawings shows a communication system as described above including a modulator 3 and a detector 10. In accordance with this embodiment of the present invention the detector 10 of the system is of the kind illustrated in FIGS. 2 to 6 of the accompanying drawings. In the preferred embodiment of the invention, the modulator is also of the kind shown in FIGS. 2 to 6 of the drawings, but with a single optical input signal and a radio frequency input signal instead of the two optical input signals and radio frequency output signal of the detector.

Figure 2:
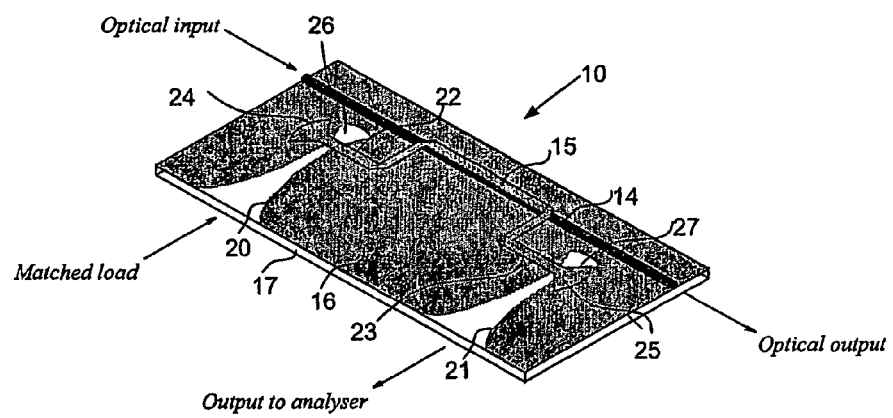
FIG. 2 is a simplified perspective view of components in a detector in accordance with a preferred embodiment of the invention.

As shown in FIG. 2, the detector is a passive detector comprising an optical ridge wave-guide. A construction of an optical ridge wave-guide is described in the article "The single-mode condition for semiconductor wave-guides with large cross-section" in the Journal of Light Wave Technology, Volume 16, pages 1851 to 1853, for example.

Figure 3:
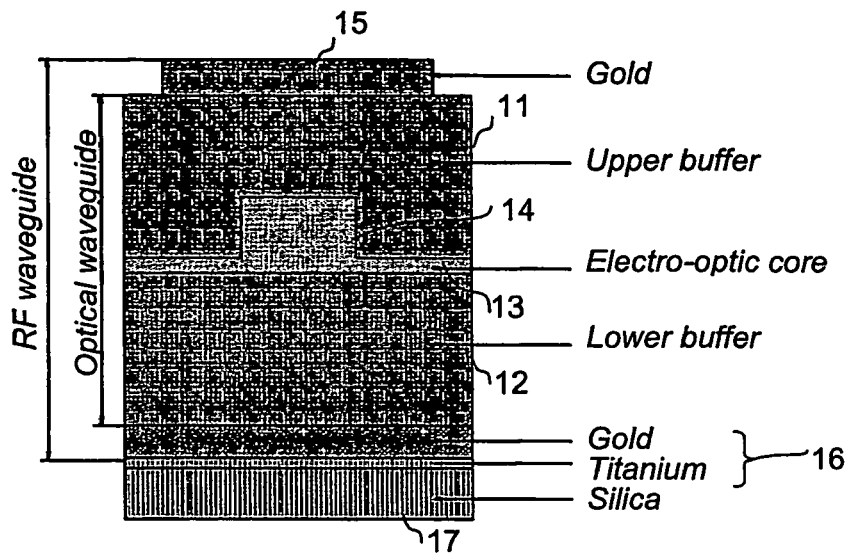
FIG. 3 is a cross-section of the detector of FIG. 2.

The optical guide used is based on the principle of total reflection at the interface between two mediums of different refractive index. As shown in FIG. 3, the optical ridge wave-guide comprises upper and lower buffer layers 11 and 12. An electro-optic core is positioned in intimate contact between the upper and lower buffer layers 11 and 12, the electro-optic core 10 comprising a layer 13 of thickness substantially less than the wavelength of the optical radiation and a ridge 14 of thickness comparable to the wavelength of the optical radiation and of width greater than the wavelength of the optical radiation. In the present example, the wavelength of the optical radiation is 1.55 microns, the thickness of the layer 13 is 0.2 microns and the thickness of the ridge 14 is 1.5 microns, the width of the ridge being 4 microns.

Figure 4:
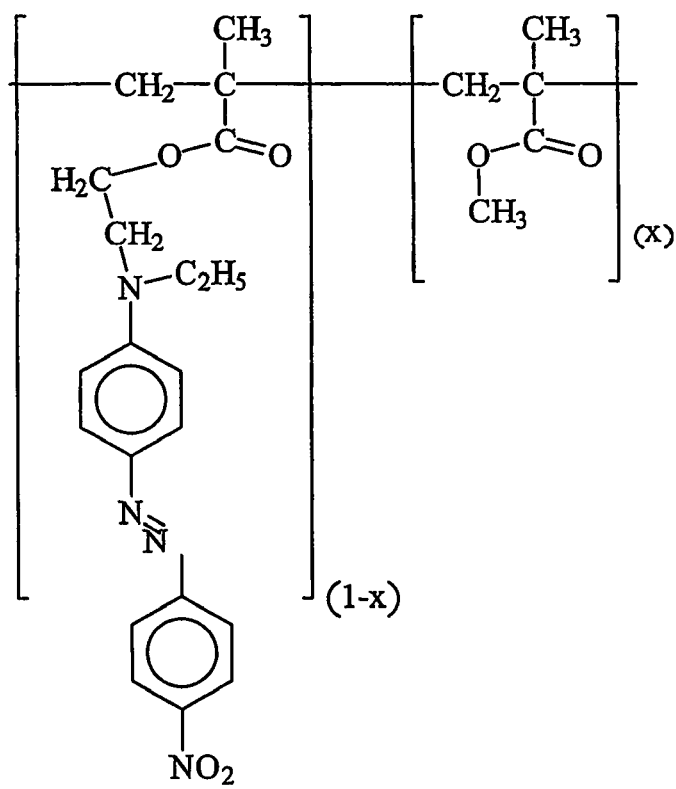
FIG. 4 is the chemical formula of a dipolar diazobenzene material in a host matrix used in the detector of FIG. 2.

In this embodiment of the invention, the interaction material of the electro-optic guide 13, 14 presents a second-order non-linear optical polarisation characteristic to the propagation of the optical signal components and more particularly is a dipolar material presenting non-centre-symmetric interaction characteristics in a host matrix polymer material. A suitable interaction material of this kind comprises electrically orientated diazobenzene. In the preferred embodiment, the electrically orientated diazobenzene is an active chromophore "Disperse Red 1" grafted to polymethylmetacrylate as host matrix ("PMMA-DR1"). The chemical formula of PMMA-DR1 is shown in FIG. 4, the left hand side of the formula being the active dipolar DR1 and the right hand side being the host PMMA. A molecule of this type placed in an electric field orients in such a way as to align with the field. Starting from an amorphous material, an orientated material can be obtained in which the polar molecules are statistically directed in similar directions to give second order non-linear optical polarisation properties, and in particular non-centre-symmetric properties.

Other non-centre-symmetric materials that are transparent to infrared radiation exist. In addition to other orientated dipolar materials, lithium niobate and most of the III-V and II-VI materials in multiple layers may be produced with suitable second-order non-linear optical polarisation characteristics. However, in the preferred embodiment, the electro-optic core 13, 14 is formed in PMMA-DR1.

In the preferred method of manufacturing the device, after addition of metal layers (described below) the component is heated to the vitreous transition point of the electro-optic core polymer, approximately 120° C. An intense electric field is applied to the metal layers used as electrodes. The electric field is maintained subsequently while the temperature is reduced towards ambient temperature.

In the preferred embodiment of the invention, the buffer layers 11 and 12 are produced in fluorinated polymers "AVO14" and "AVO01" described in the article "Fabrication of low refractive index low loss fluorinated self-cross linking polymer waveguides for optical devices" in the Proceedings of the $7^{th}$ International Plastic Optical Fibres Conference 1998, pages 316 to 323. These materials are chosen for their refractive index, which is less than that of the electro-optic core. At the wavelength of the optical radiation in the present example, 1.55 microns, the refractive index of PMMA-DR1 is 1.5965, the refractive index of AVO01 is 1.4466 and that of AVO14 is 1.4009.

The electro-optic core ridge 14 is connected with input and output optical fibres (not shown) by respective linear tapers (not shown), which adapt the shape and size of the optical fibre (typically diameter 10 microns) to the shape (rectangular cross-section) and size (approximately 4 microns) of the electro-optic core ridge 14 while reducing insertion and extraction losses.

The device shown in the drawings also includes a radio signal guide in travelling wave coupling with the optical guide formed by the electro-optic core 10. Various radio signal wave-guides may be used, such as a strip-line in which a strip extends between two ground planes, or a coplanar wave-guide in which a strip extends in the same plane as two lateral grounded strips, or a grounded coplanar wave-guide in which a coplanar wave-guide extends parallel to a grounded plane. However, in the preferred embodiment, the radio signal guide is a microstrip guide comprising a strip of width approximately 15 microns, compared with a width of approximately 4 microns for the optical wave-guide electro-optic core ridge 14, juxtaposed with a ground plane metallic layer 16 on the opposite side of the electro-optic core ridge 14. The spacing and width of the strip 15 and ground plane layer 16 are chosen so that the impedance of the microstrip at the radio signal frequency (60 GHz in this example) are compatible with standard wave-guides such as the WR15 wave-guide (50 ohms). The standard dimensions of a WR15 wave-guide are as follows:

| Band | Frequ. range | Internal dims (mm) width | Internal dims (mm) height | External dims (mm) width | External dims (mm) height | Cut-off frequ. | Losses (dB/m) |
|---|---|---|---|---|---|---|---|
| V | 50–75 GHz | 0.3759 | 0.1879 | 0.579 | 0.391 | 39.9 GHz | 0.188 |

As shown particularly in FIG. 3 of the drawings, the strip 15 is closely juxtaposed with the top surface of the upper buffer 11 and the ground plane 16 is closely juxtaposed with the bottom surface of the lower buffer 12. The length over which the microstrip 15 is in close coupling with the optical guide is chosen to be at least approximately equal to the wavelength of the radio signal, that is to say, at least 5 millimeters at the radio signal frequency of 60 GHz in this example; in the preferred embodiment of the invention, the optical/radio interaction length for this frequency is 1.3 cm. In this way, a travelling wave coupling is obtained that is found to be particularly effective for the efficiency of the device.

The dimensions of the elements of the device and the characteristics of the materials used are chosen so that the propagation velocities of the optical signal components in the optical guide and of the radio signal in the radio signal guide are substantially equal. Again, this characteristic is found to be important for the efficiency of detection (or modulation in the case of a modulator).

The behavior of the three wave mixing interaction can be presented as follows. First of all, the non-linear expression of the Maxwell equations are used to describe the interaction between the three waves:

$$\begin{cases} rot\vec{E}(\omega_i, \vec{r}) = j\omega_i\mu_0\vec{H}(\omega_i, \vec{r}) \\ rot\vec{H}(\omega_i, \vec{r}) = -j\omega_i\epsilon_0\epsilon(\omega_i)\vec{E}(\omega_i\vec{r}) - j\omega_i\vec{P}^{NL}(\omega_i, \vec{r}) \end{cases} \quad (1)$$

E and H are respectively the electrical and induction fields. $P^{NL}$ represents the non-linear polarization and is defined by:

$$\vec{P}^{NL}(\omega_k) = \epsilon_0[\chi^{NL}(\omega_k)] \otimes \vec{E}(\omega_i) \otimes \vec{E}^*(\omega_j) \quad (2)$$

$$\omega_k = \omega_i - \omega_j$$

$\omega_{i,j,k}$ represent the different frequencies and $\chi$ the non linear suceptibility of the propagation medium. In order to solve equation (1), guided mode formalism is used, where the different fields are split on an orthogonal basis constituted by the local modes, as shown by the following equation:

$$\begin{cases} \vec{E}_\upsilon(x, y, z) = \sum_{i=1}^n \alpha_i \vec{E}_\nu^i(x, y)e^{j\beta_i z} + \sum_{i=1}^n \alpha_{-i}\vec{E}_\nu^{-i}(x, y)e^{-j\beta_i z} + \vec{E}_\nu^{rad}(x, y, z) \\ \vec{H}_\upsilon(x, y, z) = \sum_{i=1}^n \alpha_i \vec{H}_\nu^i(x, y)e^{j\beta_i z} + \sum_{i=1}^n \alpha_{-i}\vec{H}_\nu^{-i}(x, y)e^{-j\beta_i z} + \vec{H}_\nu^{rad}(x, y, z) \end{cases} \quad (3)$$

The fields with positive and negative superscript are respectively propagating and contra-propagating fields. $E^{rad}$ and $H^{rad}$ are the radiating parts of the electro-magnetic field. Then, using the orthogonal properties of this decomposition, the variation of the amplitude of each wavelength is deduced from (1) and (3):

$$\begin{cases} \frac{dA_1}{dz} = j\tilde{\eta}_1 \chi^{eff} A_3 A_2^* e^{-j\Delta kz} \\ \frac{dA_2}{dz} = j\tilde{\eta}_2 \chi^{eff} A_3 A_1^* e^{-j\Delta kz} \\ \frac{dA_3}{dz} = j\tilde{\eta}_3 \chi^{eff} A_1 A_2 e^{j\Delta kz} \end{cases} \quad (4)$$

$$\tilde{\eta}_1 = \eta_1 \frac{<E_3^1 E_2^{1*}|E_1^1>}{<E_1^1|E_1^1>}$$

$$\tilde{\eta}_2 = \eta_2 \frac{<E_3^1 E_1^{1*}|E_2^1>}{<E_2^1|E_2^1>}$$

$$\tilde{\eta}_3 = \eta_3 \frac{<E_1^1 E_2^1|E_3^1>}{<E_3^1|E_3^1>}$$

The $\eta$ coefficients represent the overlap of the three fields. Finally account is taken of the absorption of the propagation medium by introducing a complex value for $\Delta k$ in the treatment of the system (4).

In the preferred embodiment of the present invention, the ground plane 16 is formed from a layer of gold deposited on a layer of titanium that is itself deposited on a layer of silica 17 serving as a support.

Figure 5:
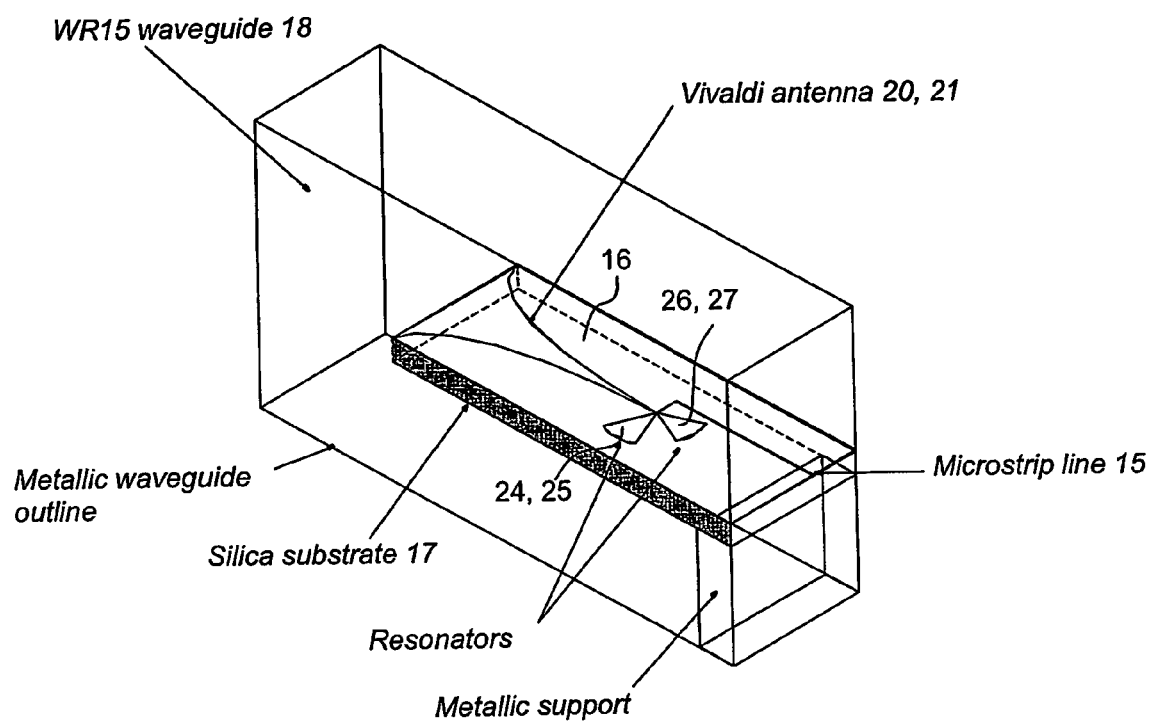
FIG. 5 is a perspective view of the detector of FIG. 2.
Figure 6:
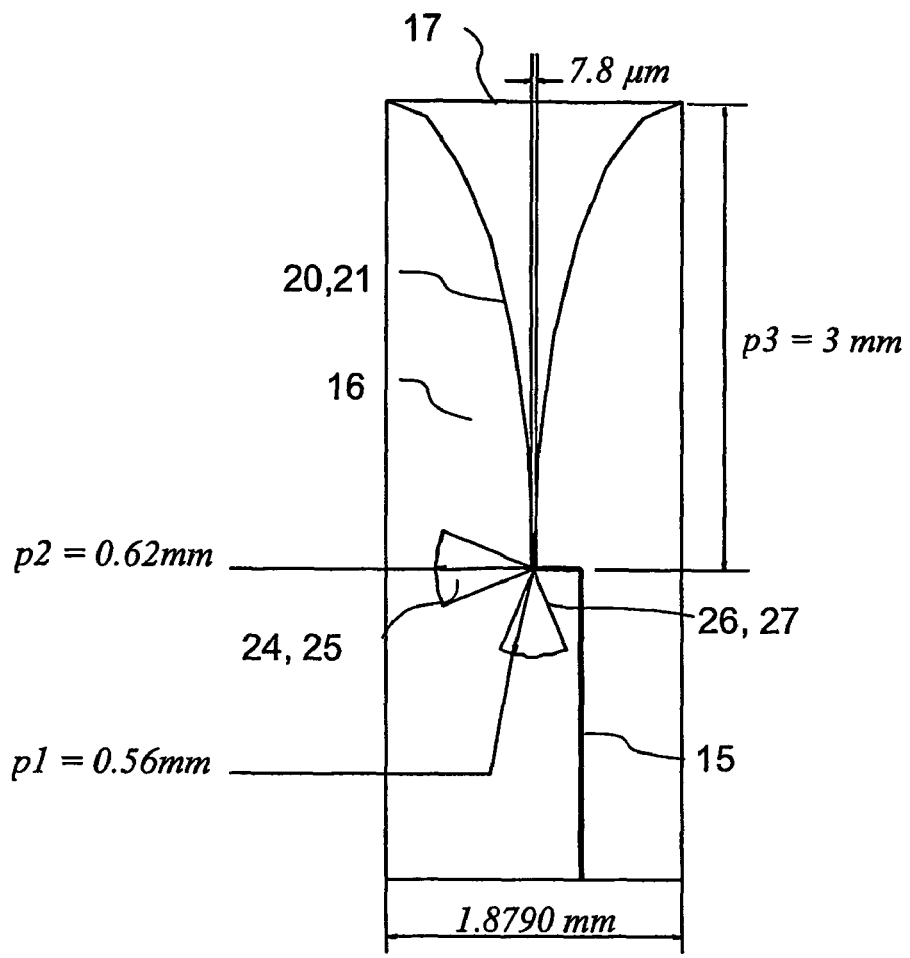
FIG. 6 is a plan view of components in the detector of FIG. 2.

As shown in FIGS. 2, 5, 6 and 7 of the drawings, the microstrip radio signal guide 15 extending parallel to and juxtaposed with the optical guide 14 is connected with external radio signal wave-guides (one of which is shown at 18 in FIGS. 5 and 6 of WR15 type (standard wave-guides for 50 to 75 GHz radio frequencies). In the preferred embodiment of the invention the WR15 wave-guides extend perpendicularly to the length of the microstrip radio signal guide 15 and the optical guide 14 and parallel to the ground plane 16.

Transition radio signal guide elements 20 and 21 are formed in the material of the ground plane 16 and present progressively varying cross sections to match the propagation characteristics of the microstrip with the WR15 wave-guides. More specifically, the guide elements 20 and 21 comprise "Vivaldi antenna" openings in the ground planes 16 of trumpet shape, of which the small end is of similar width to the microstrip 15 and the large end is of similar width to the corresponding width ('height') of the wave-guide WR15, such as 18. The Vivaldi antenna 21 is connected with the receiver circuit elements (for example, to a re-transmission circuit) while the Vivaldi antenna 20 is connected to an element presenting a matching load to the microstrip 15, to ensure that it functions in balanced conditions.

The microstrip element 15 traverses the small end of the Vivaldi antennas 20 and 21, spaced from them by the thickness of the stacked buffer layers 11 and 12 and the electro-optic layer 13, 14. In the embodiment of the invention shown in FIGS. 2, 5 and 6, the microstrip 15 includes extensions 22 and 23 that are parallel with, but staggered relative to, the part of the microstrip 15 in radio signal coupling relationship with the optical guide 14. The small ends of the Vivaldi antennas 20 and 21 are also spaced relative to the optical guide 14. However, in an alternative embodiment of the invention shown in FIG. 7, the small ends of the Vivaldi antennas 20 and 21 are disposed directly beneath the optical guide 14 and the microstrip-line 15 is entirely in line with the optical guide 14 and in radio signal coupling relationship therewith.

In order to improve the frequency range of the device, radio signal frequency resonators 24, 25 are formed in the shape of quadrant (or "fan") resonators as extensions of the ends of the microstrip 15 and resonators 26, 27 are formed as extensions of the openings at the small ends of the Vivaldi antennas 20 and 21. The resonators are designed with dimensions such that they present termination impedances matched to the impedances of the microstrip 15 and the Vivaldi antenna 20,21, respectively, at the operating radio frequency. They effectively minimise the termination reflection coefficient in the plane of propagation of the radio signal in the corresponding element.

As shown in FIG. 6, in the preferred embodiment of the invention, for a 60 GHz radio carrier signal, the Vivaldi antennas 20 and 21 are preferably 7.8 microns wide at the small end and 1.879 mm wide at the wide end and 3 mm long. The resonators 26 and 27 of the Vivaldi antennas are preferably of radius 0.56 mm and the resonators 24 and 25 of the microstrip are preferably of radius 0.62 mm.

Figure 7:
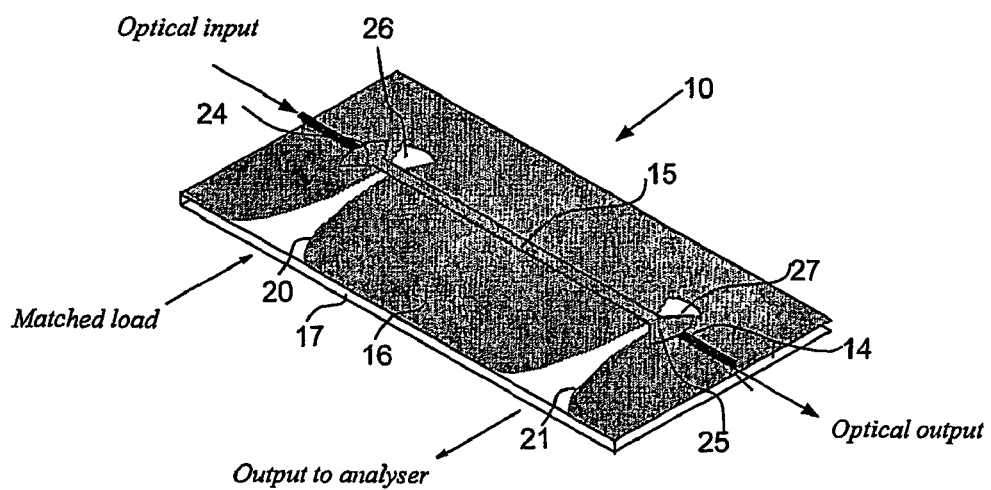
FIG. 7 is a simplified perspective view, similar to FIG. 2 of components in a detector in accordance with another preferred embodiment of the invention.

In operation of the devices shown in FIG. 2 and FIG. 7, two optical signal components having frequencies that differ by an amount corresponding to the radio signal carrier frequency are applied to the optical input of the optical guide 14. The two optical components interact in the second-order non-linear optical polarisation material of the electro-optical core 14. The close coupling of the microstrip 15 and ground plane 16 with the optical guide 14 causes the radio frequency signals that result to be induced in the microstrip-line 15. The line 15, together with its extensions 22 and 23 in the case of the embodiment shown in FIG. 2, and the Vivaldi antennas 20 and 21 extending within the WR15 wave-guides as shown in FIG. 4 transmit the radio frequency signal to the WR15 wave-guide 18 and the radio signal is received in the wave-guide.

In a modulator device such as 3 of similar construction, a radio signal propagated in the WR15 wave-guide with a single optical component propagated in the optical guide modulates the optical component so that at the output of the optical wave-guide two optical components are propagated.

It is found that the output power of the electrical signal in the case of the detector device shown in the drawings is proportional to the square of the radio frequency, so that substantially higher efficiencies are obtained than in other devices whose efficiency reduces with frequency. The output of the radio signal is also proportional to the square of the interaction link and to the square of the input power of the optical signal: consequently the device is more efficient the more intense the optical signals but, concerning the interaction links, absorption of the optical signals in the optical guide limits the length of the optimum interaction link.

The invention claimed is:

1. An optical to radio frequency detector comprising an optical guide for receiving two optical signal components having frequencies that differ by an amount corresponding to a radio frequency, a radio signal guide extending along and in travelling-wave coupling with an interaction zone of said optical guide for propagating a radio signal from said interaction zone at said radio frequency, and a radio signal output coupled with said radio signal guide for outputting said radio signal, wherein said interaction zone of said optical guide comprises an interaction material presenting a second-order non-linear optical polarisation characteristic to the propagation of said optical signal components.

2. An optical to radio frequency detector as claimed in claim 1, wherein said interaction zone and said travelling-wave coupling of said radio signal guide extend over a length of said optical guide at least as great as the wave-length of said radio signal in said radio signal guide.

3. An optical to radio frequency detector as claimed in claim 1, wherein the propagation velocities of said optical signal components in said interaction zone and of said radio signal in said radio signal guide are substantially equal.

4. An optical to radio frequency detector as claimed in claim 1, wherein said interaction material comprises a dipolar material presenting non-centre-symmetric interaction characteristics to said optical signals.

5. An optical to radio frequency detector as claimed in claim 4, wherein said dipolar material includes a diazobenzene chromophore material having orientated electrical characteristics in a host matrix polymer material.

6. An optical to radio frequency detector as claimed in claim 1, wherein said optical guide comprises a ridge formed in said interaction material at an interface with a material, said interaction material having dimensions such that said optical signal components are channelled to propagate along said ridge.

7. An optical to radio frequency detector as claimed in claim 1, wherein said radio signal guide comprises an electrically conductive strip juxtaposed with and extending along said interaction zone on one side of said interaction zone and a further electrically conductive element juxtaposed with and extending along said interaction zone on an opposite side of said interaction zone.

8. An optical to radio frequency detector as claimed in claim 1 which is a passive detector for passive propagation of said radio signal in said radio signal guide, without supply of power other than said optical signal components.

9. Communication apparatus comprising a detector and an optical input for said detector, said detector being an optical to radio frequency detector as claimed in claim 1, and said optical input being arranged to supply said optical signal components to said optical guide.

10. Communication apparatus as claimed in claim 9, wherein said optical input comprises a modulator for modulating an optical signal with a radio signal so as to generate said optical signal components.

11. Communication apparatus as claimed in claim 10, wherein said modulator comprises a modulator optical guide for receiving said optical signal and a modulator radio signal guide in travelling-wave coupling with a modulator interaction zone of said modulator optical guide for coupling a radio signal at said radio frequency to said modulator interaction zone so as to generate said optical signal components, wherein said interaction zone of said modulator optical guide comprises an interaction material presenting a second-order non-linear optical polarization characteristic to the propagation of said optical signal.

12. Communication apparatus as claimed in claim 11, wherein said interaction zone and said travelling-wave coupling of said modulator radio signal guide extend over a length of said modulator optical guide at least as great as the wave-length of said radio signal in said modulator radio signal guide.

13. Communication apparatus as claimed in claim 11, wherein the propagation velocities of said optical signal components in said modulator optical guide and of said radio signal in said modulator radio signal guide are substantially equal.

14. Communication apparatus as claimed in claim 11, wherein said interaction material of said modulator optical guide comprises a dipolar material presenting non-centre-symmetric interaction characteristics to said optical signals.

15. Communication apparatus as claimed in claim 14, wherein said interaction material of said modulator optical guide includes a diazobenzene chromophore material having orientated electrical characteristics in a host matrix polymer material.

16. Communication apparatus as claimed in claim 10, wherein said modulator optical guide comprises a ridge formed in said interaction material at an interface with a material, said interaction material having dimensions such that said optical signal components are channelled to propagate along said ridge.

17. Communication apparatus as claimed in claim 10, wherein said modulator radio signal guide comprises an electrically conductive strip juxtaposed with and extending along said modulator interaction zone on one side of said interaction zone and a further electrically conductive element juxtaposed with and extending along said modulator interaction zone on an opposite side of said interaction zone.

* * * * *